United States Patent
Van Veen et al.

(10) Patent No.: US 12,074,644 B2
(45) Date of Patent: Aug. 27, 2024

(54) MODULATION SWITCHOVER IN FLEXIBLE PON

(71) Applicant: Nokia Solutions and Networks Oy, Espoo (FI)

(72) Inventors: Doutje Van Veen, New Providence, NJ (US); Vincent Houtsma, New Providence, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 61 days.

(21) Appl. No.: 18/060,817

(22) Filed: Dec. 1, 2022

(65) Prior Publication Data
US 2024/0187101 A1    Jun. 6, 2024

(51) Int. Cl.
*H04B 10/516* (2013.01)
*H04B 10/079* (2013.01)
(Continued)

(52) U.S. Cl.
CPC ... *H04B 10/5161* (2013.01); *H04B 10/07953* (2013.01); *H04L 1/0003* (2013.01);
(Continued)

(58) Field of Classification Search
CPC ......... H04B 10/5161; H04B 10/07953; H04L 1/0003; H04L 1/0032; H04L 1/0042; H04Q 11/0067; H04Q 2011/0088
(Continued)

(56) References Cited

U.S. PATENT DOCUMENTS

| | | | |
|---|---|---|---|
| 8,369,705 B2* | 2/2013 | de Lind van Wijngaarden | H04Q 11/0066 398/71 |
| 2005/0135730 A1* | 6/2005 | Welch | G02B 6/12007 385/14 |

(Continued)

FOREIGN PATENT DOCUMENTS

| | | |
|---|---|---|
| EP | 2068469 A1 | 6/2009 |
| EP | 3985896 A1 | 4/2022 |

(Continued)

OTHER PUBLICATIONS

Hakjeon Bang et al., "Analysis of Modulation Order to Guarantee Real-Time Service Throughputs in OFDMA-PON," IEEE Communications Letters, vol. 19, Issue 4, Apr. 2015.

(Continued)

*Primary Examiner* — Dalzid E Singh
(74) *Attorney, Agent, or Firm* — Harness, Dickey & Pierce, P.L.C.

(57) ABSTRACT

A network element includes at least one processor and at least one memory. The at least one non-transitory memory including computer program code configured to, when executed by the at least one processor, cause the apparatus to determine whether a bit error rate (BER) of a FEC codeword is at or below a correctable BER, wherein the FEC codeword is transmitted between an OLT and ONU, a first percentage of the FEC codeword is at a lower order modulation, and a second percentage of the FEC codeword is at a higher order modulation, establish, based on a determination that the BER is at or below the correctable BER, a connection between the OLT and the ONU at the higher order modulation, and maintain, based on a determination that the BER is greater than the correctable BER, the (Continued)

connection between the OLT and the ONU at the lower order modulation.

15 Claims, 9 Drawing Sheets

(51) Int. Cl.
*H04L 1/00* (2006.01)
*H04Q 11/00* (2006.01)

(52) U.S. Cl.
CPC .......... *H04L 1/0032* (2013.01); *H04L 1/0042* (2013.01); *H04Q 11/0067* (2013.01); *H04Q 2011/0088* (2013.01)

(58) Field of Classification Search
USPC .......................................................... 398/27
See application file for complete search history.

(56) References Cited

U.S. PATENT DOCUMENTS

| | | | |
|---|---|---|---|
| 2012/0237220 A1 | 9/2012 | Presi et al. | |
| 2013/0156420 A1* | 6/2013 | Amitai | H04L 1/0009 398/27 |
| 2014/0181616 A1* | 6/2014 | Arunarthi | H04L 7/0337 714/755 |
| 2014/0294388 A1 | 10/2014 | Odaka et al. | |
| 2014/0301734 A1* | 10/2014 | Fang | H04B 10/516 398/115 |
| 2016/0105236 A1 | 4/2016 | Zhang et al. | |
| 2018/0343065 A1 | 11/2018 | Li et al. | |

FOREIGN PATENT DOCUMENTS

| | | |
|---|---|---|
| WO | 2014/100508 A1 | 6/2014 |
| WO | 2018/162743 A1 | 9/2018 |
| WO | WO-2019/076340 A1 | 4/2019 |

OTHER PUBLICATIONS

ITU-T G.9804.3, "Series G: Transmission Systems and Media, Digital Systems and Networks; Access networks—Optical line systems for local and access networks; 50-Gigabit-capable passive optical networks (50G-PON):Physical media dependent (PMD) layer specification" Sep. 2021.
Extended European Search Report issued Apr. 29, 2024 in European Application No. 23213294.4.

* cited by examiner

MODULATION SWITCHOVER IN FLEXIBLE PON

BACKGROUND

Communication networks, like time-division multiplexing (TDM) passive optical networks (PON), which include optical components, may include one or more network-side devices simultaneously broadcasts a downstream signal to multiple user-devices on a specified downstream wavelength and various user-devices transmitting via on specified upstream wavelengths, which may be different from the downstream wavelength, to the network-side device.

In order to provide both reliability and to performance requirements of the international telecommunication union's (ITU's) standards, research has been conducted on flexible communication networks which to take advantage of the channel and operating conditions of individual user-devices, and the connections thereof, to provide higher throughput to user-devices that operate under more benign channel conditions. One of the mechanisms to improve throughput is by employing a flexible framework that uses mixed modulation in the downstream direction where higher density signalling may be interleaved with lower density signalling. For example, user-devices capable of successfully detecting and decoding non-binary signals can then be serviced with a higher throughput as compared with user-devices operating closer to the worst case conditions that can only successfully detect and decode binary signals.

SUMMARY

The scope of protection sought for various example embodiments is set out by the independent claims. The example embodiments and/or features, if any, described in this specification that do not fall under the scope of the independent claims are to be interpreted as examples useful for understanding various embodiments.

At least one example embodiment provides method of operating an Optical Line Terminal (OLT) in a Passive Optical Network (PON), the method comprising: determining whether a bit error rate (BER) of a forward error correction (FEC) codeword is at or below a correctable BER, wherein the FEC codeword is transmitted between the OLT and an optical network unit (ONU), a first percentage of the FEC codeword is at a lower order modulation, and a second percentage of the FEC codeword is at a higher order modulation; and establishing, based on a determination that the BER is at or below the correctable BER, a connection between the OLT and the ONU at the higher order modulation.

At least one other example embodiment provides an apparatus comprising: at least one processor; and at least one non-transitory memory including computer program code configured to, when executed by the at least one processor, cause the apparatus to determine whether a bit error rate (BER) of a forward error correction (FEC) codeword is at or below a correctable BER, wherein the FEC codeword is transmitted between an optical line terminal (OLT) and an optical network unit (ONU), a first percentage of the FEC codeword is at a lower order modulation, and a second percentage of the FEC codeword is at a higher order modulation, establish, based on a determination that the BER is at or below the correctable BER, a connection between the OLT and the ONU at the higher order modulation, and maintain, based on a determination that the BER is greater than the correctable BER, the connection between the OLT and the ONU at the lower order modulation.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of this disclosure.

Figure 1:
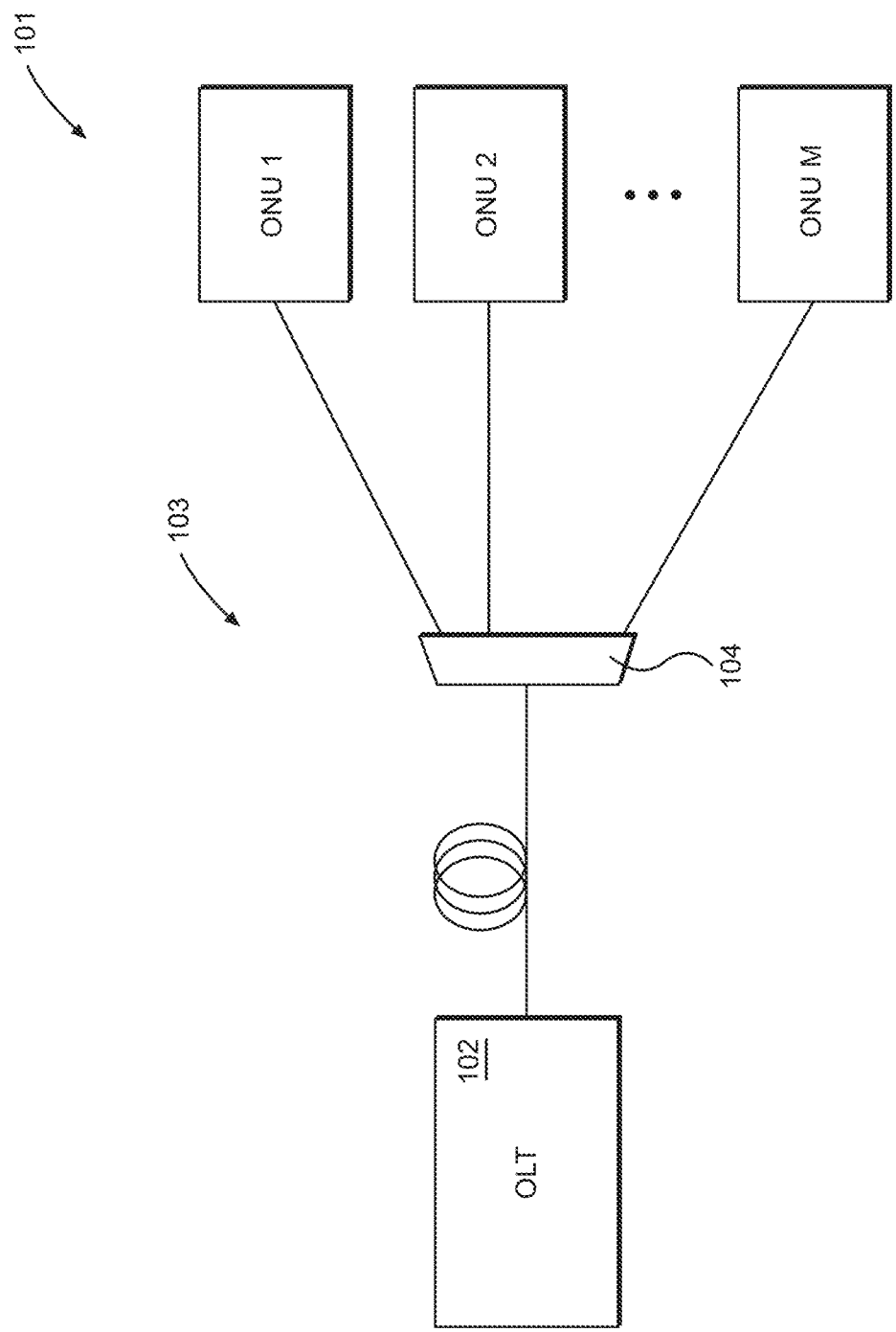
FIG. 1 is a schematically depicts a communication network.

It should be noted that these figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. The use of similar or identical reference numbers in the various drawings is intended to indicate the presence of a similar or identical element or feature.

DETAILED DESCRIPTION

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. The example embodiments may, however, be embodied in many alternate forms and should not be construed as limited to only the embodiments set forth herein. Like numbers refer to like elements throughout the description of the figures.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Although the terms "first," "second," "third,"

etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

When the terms "about" or "substantially" are used in this specification in connection with a numerical value, it is intended that the associated numerical value includes a manufacturing tolerance (e.g., +10%) around the stated numerical value. Further, regardless of whether numerical values are modified as "about" or "substantially," it will be understood that these values should be construed as including a manufacturing or operational tolerance (e.g., +10%) around the stated numerical values.

FIG. 1 is a schematically depicts a communications network.

The communications network 101 may comprise a network side device (e.g., optical line terminal (OLT) 102) at the network side, a plurality of user modems (e.g., optical network units ONU 1 to ONU M) at the user side, and an Optical Distribution Network (ODN) indicated generally at 103 for communication between the OLT 102 with the plurality of ONUs. The ODN 103 may comprise a passive optical power splitter 104 for splitting and combining communication channels between the OLT and the ONUs. In the illustration the communication network 101 is depicted as comprising one OLT 102 and three ONUs, 1 to M. This is for clarity of illustration, and in practice the communication network 101 may comprise more OLT and/or more or fewer ONUs.

In at least one example, the communications network 101 may include a point-to-multi-point (P2MP) topology, and be, e.g., a passive optical network (PON), for example, a 50-Gigabit PON (G.hsp) conforming to ITU-T G.9804.3 standard. In at least one embodiment, the communications network 101 may be configured to operate based on a time-division multiplexing (TDM) PON standard that may employ a higher gigabit per second (Gb/s) in the downstream (e.g., from the network to a user) compared to the upstream (e.g., from the user to the network).

For example, the TDM PON may include at least one network-side device (hereafter OLT 102 for simplicity of description) simultaneously broadcasting the downstream signal to multiple user-side devices (hereafter ONUs for simplicity of description) over a shared ODN 103 on the specified downstream wavelength. The various ONUs may communicate with the OLT 102 via burst mode TDM access on a specified upstream wavelength, which may be different from the downstream wavelength. For example, in at least one example, the communications network may employ 50 Gb/s per wavelength (λ) non-return to zero (NRZ) transmission in the downstream (DS) and at least one of 12.5 Gb/s and/or 25 Gb/s per λ NRZ in the upstream (US). The OLT 102 and the ONUs may be configured to communicate using binary and/or non-binary signals.

Figure 2A:
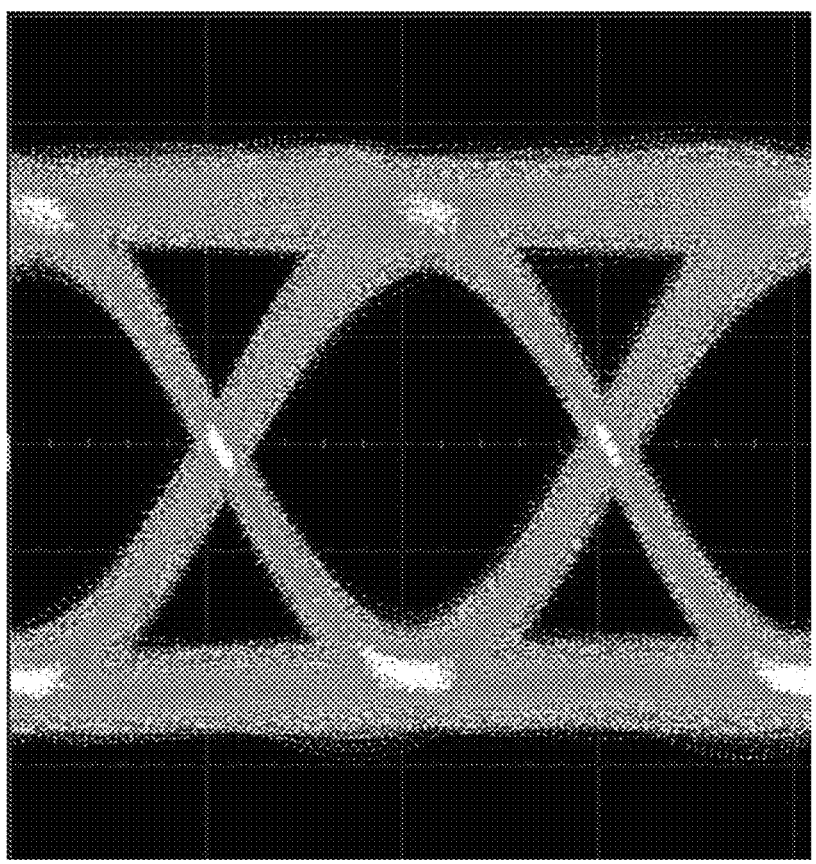
FIG. 2A illustrates a binary signal according to at least one example embodiment.
Figure 2B:
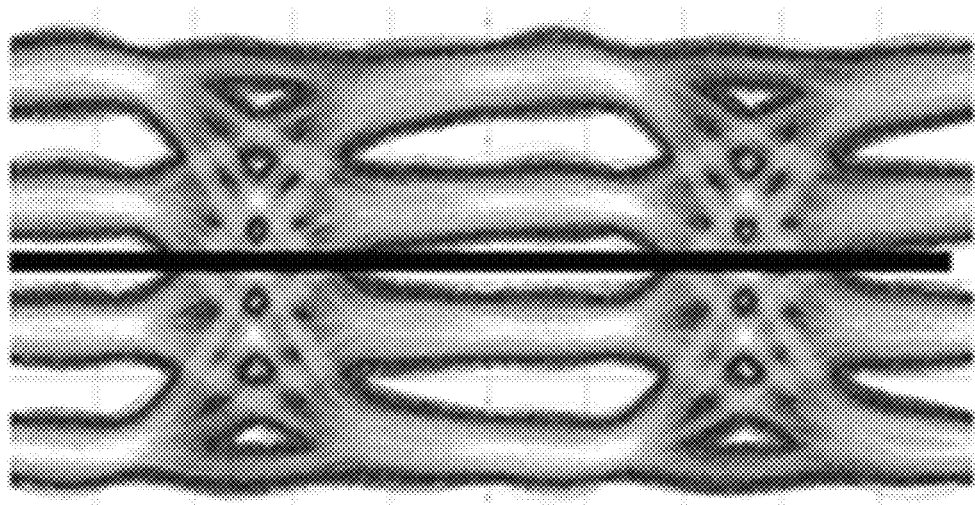
FIG. 2B illustrates a non-binary signal according at least one example embodiment.

FIG. 2A illustrates a binary signal according to at least one example embodiment; and FIG. 2B illustrates a non-binary signal according to at least one example embodiment.

The binary optical signal may be a non-return-to-zero (NRZ) signal which does not return to a "zero-ed" state between bits, wherein the "1" is represented a first state (e.g., a high and/or positive signal state) and the "0" is represented by second state (e.g., a low and/or negative signal state). The NRZ signal may also be referred to as a PAM2 signal.

The non-binary optical signal may be a pulse amplitude modulation 4-level (PAM4) signal, including a most significant bit (MSB) and a least significant bit (LSB). In the MSB a "1" may be represented a first state (e.g., a high and/or positive ("+1") signal state) and a "0" may be represented by second state (e.g., a low and/or negative ("−1") signal state); and, in the LSB, a "1" may be represented a first intermediate state (e.g., a high and/or positive ("+⅓") intermediate signal state) and a "0" may be represented by second intermediate state (e.g., a low and/or negative ("−⅓") intermediate signal state).

The NRZ and PAM4 signals may, respectively, exhibit the characteristic single-eye pattern and the 3-eye pattern. The PAM4 signal may be more informationally dense compared to the NRZ since the PAM4 signal can include more bits per unit interval ("UI"). For example, a signal represented by "00011011011100" may be transmitted in at least half the time if transmitted using the non-binary signal instead of the binary signal. However, because the height of the eye (e.g., the difference between the signal states) in the NRZ is greater than the height of the NRZ signal, the NRZ signal may be less suspectable to noise, degradation, and/or error. As such, the binary signal may be less informationally dense but more robust when compared the non-binary signal, and therefore may be preferred in connections suffering from less benign conditions (e.g., wherein the communications network is suffering from old and/or degraded cable, pinched or overly bend cable, cross-talk, misalignment, and/or the like).

A communications network (e.g., the communications network 101 of FIG. 1) may be configured to operate under a hybrid modulation to introduce multi-rate transmissions based on the channel and operating conditions of the individual ONUs. For example, in at least one example embodiment, a flexible PON framework uses mixed modulation in the downstream direction with PAM4 signalling interleaved with NRZ signalling such that ONUs capable of successfully detecting and decoding the PAM4 signal can then be serviced with a higher throughput while ONUs operating closer to the worst case conditions can still successfully detect and decode 2-level NRZ signals, thereby allowing for higher throughput to ONUs that operate under more benign channel conditions without sacrificing the reliability of signals to and from ONUs that operate under less benign channel conditions (e.g., conditions closer to the worst case conditions) and without interruption of service to those ONUs.

Figure 3:
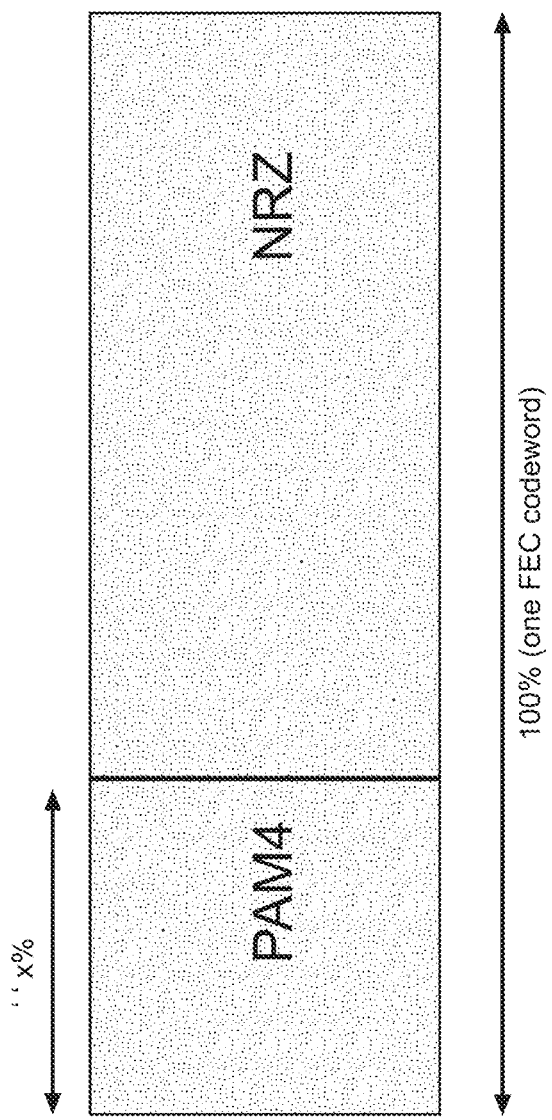
FIG. 3 illustrates forward error correction (FEC) codeword including a percentage of PAM4 according to at least one example embodiment.
Figure 4:
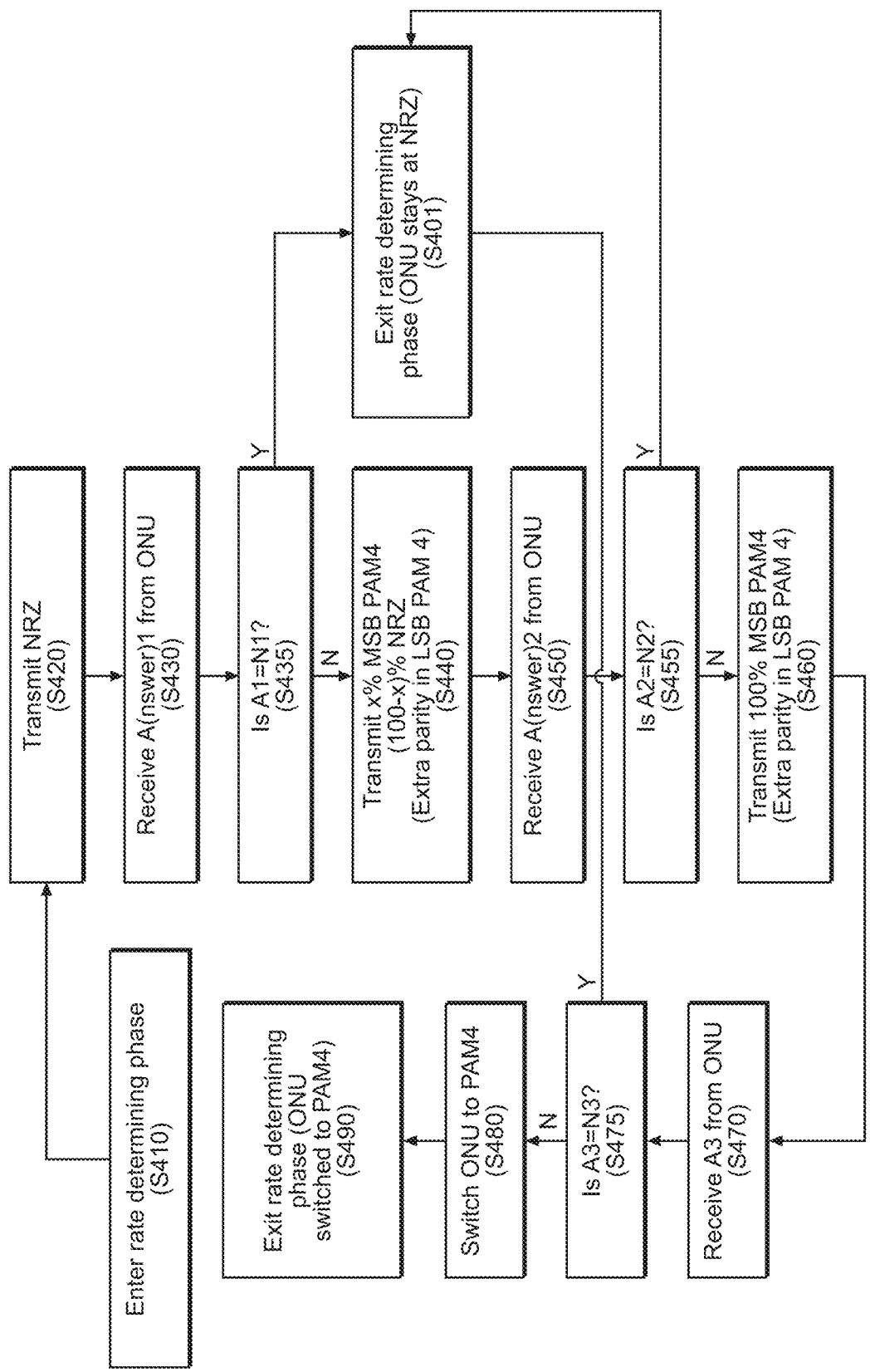
FIG. 4 is a flow chart illustrating a method of operation for an Optical Line Terminal (OLT)
Figure 5:
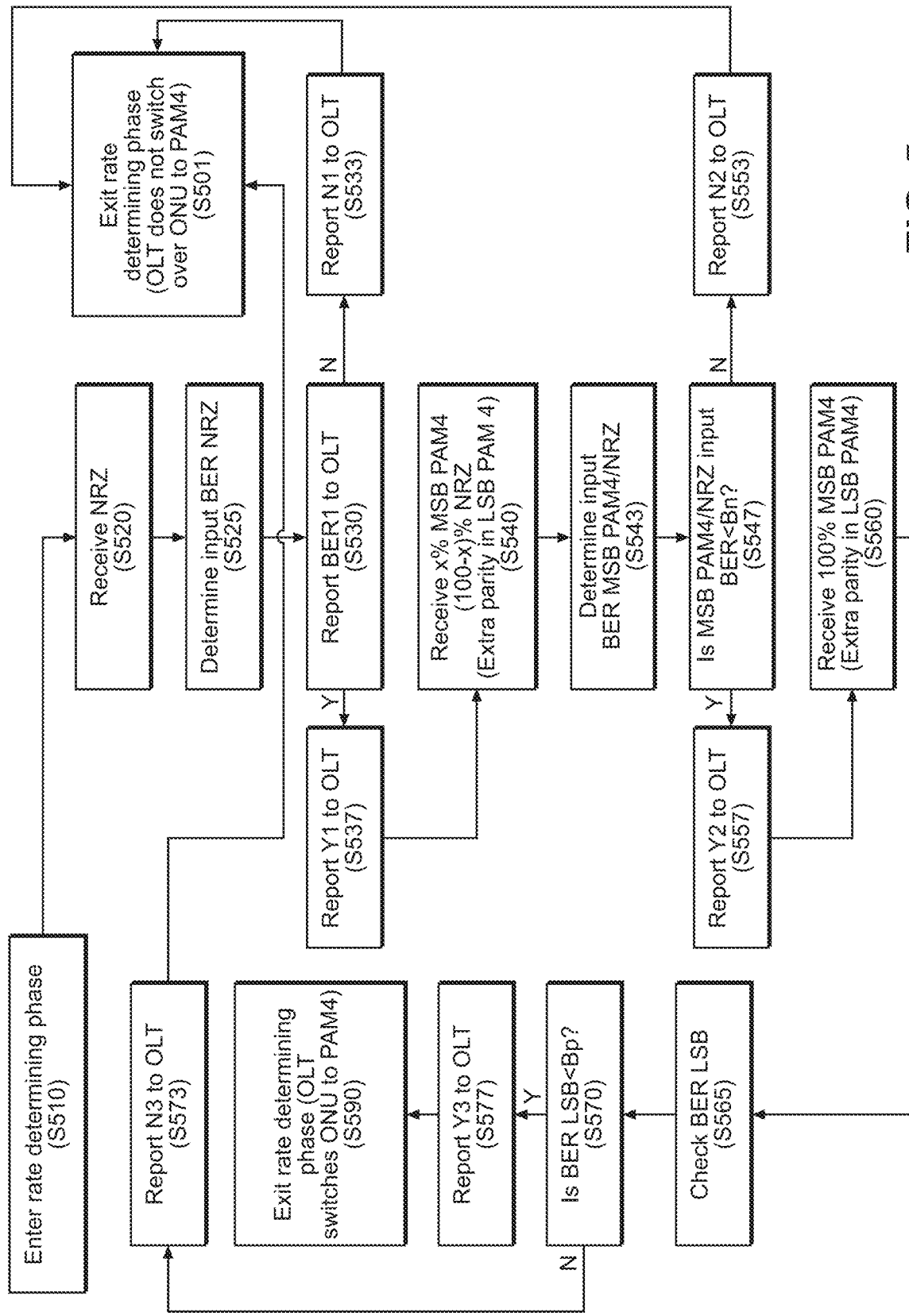
FIG. 5 is a flow chart illustrating a method of operation for an Optical Network Unit (ONU)

FIG. 3 illustrates forward error correction (FEC) codeword including a percentage of PAM4 according to at least one example embodiment; FIG. 4 is a flow chart illustrating a method of operation for an Optical Line Terminal (OLT); and FIG. 5 is a flow chart illustrating a method of operation for an Optical Network Unit (ONU).

In at least one embodiment, an OLT and/or an ONU included in a communication network may enter a rate determining phase (S410 and S510). In at least one embodiment, the rate determining phase may be entered before and/or after communication is established between the OLT and the ONU. For example, in at least one embodiment the ONU may enter the rate determining phase after the initialization of the ONU to the communication network; and/or the OLT may enter the rate determining phase in response to a notification that that a new ONU has been established in the communication network. In at least one embodiment, the OLT and ONU may periodically enter the rate determining phase to confirm the channel conditions and/or the quality of the communication between the OLT and the ONU. In these examples, the ONU is already fully operational at, at least, a lower order modulation.

In at least one embodiment, the OLT may transmit a lower order modulation test signal to the ONU (S420) and the ONU may receive the lower order modulation test signal (S520). In at least some embodiments, the modulation may be a PAM, a quadrature amplitude modulation (QAM), and/or the like. For example, the lower order modulation test signal may have a lower order of modulation with a lower bit-rate compared to a higher order modulation with a higher bit-rate. In at least one example embodiment, the lower order modulation test signal may be a binary signal such as an NRZ, but the example embodiments are not limited thereto. For example, in the cases wherein a modulation greater than a binary signal is already established, the lower order modulation may include a non-binary modulation and the higher order modulation may be of a greater order than the established modulation. For example, in the cases wherein the modulation is a PAM, the lower order modulation may start at, e.g., one of PAM3, PAM4, PAM6, etc. and the higher order modulation may include a modulation of an order greater than the lower order modulation (e.g., at least one of PAM4, PAM6, PAM8, etc.). In at least one embodiment, for example, the lower order modulation may be, e.g. PAM4, and the higher order modulation may be, e.g., PAM8, and the below description would be adapted accordingly. Similarly, in the case wherein the modulation is a QAM, the lower order modulation may start at, e.g., 16QAM, 32QAM, 64QAM, etc. and the higher order modulation may include a modulation of an order greater than the lower order modulation (e.g., at least one of 32QAM, 64QAM, 128QAM, etc.) and the below description would be adapted accordingly.

The lowest order modulation test signal may include, for example, a first forward error-correction (FEC) codeword. For example, the first FEC codeword may be included in a burst signal include a plurality of the FEC codewords. In at least one embodiment, the OLT may include processing circuitry, such as a FEC encoder, configured to transform a message into an FEC codeword by adding redundant data and/or parity bits to the message; and/or the ONU may include processing circuitry, such as an FEC decoder, configured to detect a bit error rate (BER) of the message input to communication network by the OLT. The ONU may determine the input bit error rate (BER) for the test signal (S525) and/or may compare the input BER to an initial threshold value ($B_0$). For example, in at least one embodiment the ONU may determine the BER at the input of the ONU's FEC decoder to determine if an attempt can be made to switch the ONU over to a higher order modulation.

The ONU may transmit a first Answer (A1) to the OLT (S530) and the OLT may receive the first Answer A1 (S430). The first Answer A1 may include at least one of the input BER and/or the results of the comparison of the input BER to the initial threshold value ($B_0$). For example, the OLT and/or the ONU may determine and/or confirm whether the input BER is less than the initial threshold value ($B_0$). The OLT and/or the ONU may proceed or exit the rate determining phase based on the first Answer A1 (S435).

In the N1 case (S533) (e.g., wherein the input BER is greater than the initial threshold value $B_0$), the OLT and the ONU may exit the rate determining phase (S401 and S501), and communication between the OLT and the ONU may be maintained at the lower order modulation.

In the Y1 case (S537) (e.g., wherein the input BER is less than or equal to the initial threshold value $B_0$), the OLT may transmit a second test signal (S440). The second test signal may be (and/or include) a mixed modulation FEC codeword including both the lower order modulation and a higher order modulation (e.g., a non-binary signal such as the PAM4). In at least one embodiment, the lower order modulation may comprise the majority of the second FEC codeword. For example, the second FEC codeword may include an x % of the higher order modulation, and/or in at least one embodiment the percentage x % of the higher order modulation in the second FEC codeword may be 10% and/or less, 5% and/or less, and/or the like.

In at least one embodiment, the message of the second FEC codeword is transmitted only at the lower order modulations of the mixed modulation FEC codeword. For example, in the case wherein the higher order modulation includes an MSB and an LSB, the message data of the second FEC codeword may be included in the MSB but not in the LSB. However, in at least one example embodiment, the redundant data and/or the parity bits may be included in the LSB.

The ONU may receive the second test signal (S540) and may determine the BER of the second test signal (S545). In at least one embodiment the ONU may also compared the BER of the second test signal to a correctable threshold ($B_n$) (S547). The correctable threshold $B_n$ may represent a maximum error threshold wherein a BER less than or equal to the correctable threshold $B_n$ is reliably correctable by the ONU. For example, the correctable threshold $B_n$ may be set to accommodate for manufacturing and/or standards tolerances within the communications network.

The ONU may transmit a second Answer (A2) to the OLT and the OLT may receive the second Answer A2 (S450). The second Answer A2 may include at least one of the BER of the second test signal and/or the results of the comparison of the BER of the second test signal to the correctable threshold value ($B_n$). For example, in at least one embodiment, the OLT and/or the ONU may determine and/or confirm whether the BER is less than the correctable threshold value ($B_n$). The OLT and/or the ONU may proceed or exit the rate determining phase based on the second Answer A2 (S455).

In the N2 case (S553) (e.g., wherein the BER of the second test signal is greater than the correctable threshold value $B_n$), the OLT and the ONU may exit the rate determining phase (S401 and S501), and communication between the OLT and the ONU may be maintained at the lower order modulation.

In the Y2 case (S557) (e.g., wherein the input BER is less than or equal to the initial threshold value $B_0$), the OLT may increase the percentage x % of the higher order modulation. For example, in at least one embodiment, the OLT may increase the percentage x % of the higher order modulation to 100% (S460). However, the example embodiments are not limited thereto, and in at least one example embodiment, the OLT and/or the ONU may be configured to repeat operations S440-S455 and/or S540-S550 with incrementally increasing values for the percentage of the higher order modulation (x %). For example, in at least one embodiment, BER of the second test signal can be determined based on increasing percentages of the higher order modulation (x %), and percentage of the higher order modulation (x %) may be increased, e.g., until the N2 case is obtained and/or the test signal is 100% the higher order modulation.

In at least one embodiment, a final check of the 100% higher order modulation signal is performed (S460 through S475, and S560 through S570,). For example, in the case wherein the higher order modulation includes the MSB and the LSB, the final check may compare the BER of the LSB to a correctable error threshold ($B_p$) for the LSB (S563 and S567).

The ONU may transmit a third Answer (A3) to the OLT (S570) and the OLT may receive the third Answer A3 (S470). The third Answer A3 may include a result of the final check.

In the N3 case (S573) (e.g., wherein the BER LSB is greater than the threshold value $B_p$), the OLT and the ONU may exit the rate determining phase (S401 and S501), and communication between the OLT and the ONU may be maintained at the lower order modulation.

In the Y3 case (S577) (e.g., wherein the BER LSB is less than or equal to the initial threshold value $B_p$), the OLT and the ONU switch to communicating using the higher order modulation (S480) and may exit the rate determining phase (S490 and S590). However, the example embodiments are not limited thereto, and in at least one example embodiment, the final check may be omitted.

Additionally, in at least one embodiment different from what is illustrated, the FEC codeword may be transmitted upstream from the ONU to the OLT, and the above description adapted accordingly. For example, the ONU may transmit the lower order modulation test signal and the OLT may determine, locally, whether the BER of the FEC codeword is less than or equal to the initial threshold value ($B_0$). In these cases, the ONU may transmit the lower order modulation test signal in response to a request from the OLT and/or in response to entering the test phase, and, if the BER of lower order modulation is measured to be low enough, the OLT can instruct the ONU to increase percentage of higher order modulation until switch over can be made.

In some examples, the ONU may transmit a burst signal including a plurality of the FEC codewords, and in at least one example, the last FEC codeword included in the burst signal may be shorter than the other FEC codewords included in the burst. This may increase the coding gain of the last codeword. However, the switchover procedure should be based on the conventional length FEC codewords in cases where, e.g., the BER of the conventional FEC codewords is greater than the initial threshold value ($B_0$), even if the BER of the shorter FEC codeword is less than or equal to the initial threshold value ($B_0$).

In at least one example embodiment, the OLT and/or the ONU may be configured to repeat operations S440-S455 and/or S540-S550 for a higher order modulation. For example, before exiting the rate determining phase (S490 and S590), the order of modulation may be sequentially increased to test for a correctable highest order of modulation (e.g., a first higher order modulation signal (e.g., PAM4), a second higher order modulation signal (e.g., PAM8), etc.). For example, the modulation can be increased to a modulation greater than the previously test "higher order" modulation. For example, in at least one embodiment, wherein the modulation is PAM, the BER can be tested sequentially through, e.g., PAM3, PAM4, PAM6, PAM8, etc. (and/or the like) and the connection can be established at a highest order modulation wherein the BER is at or less than the correctable BER.

Figure 6:
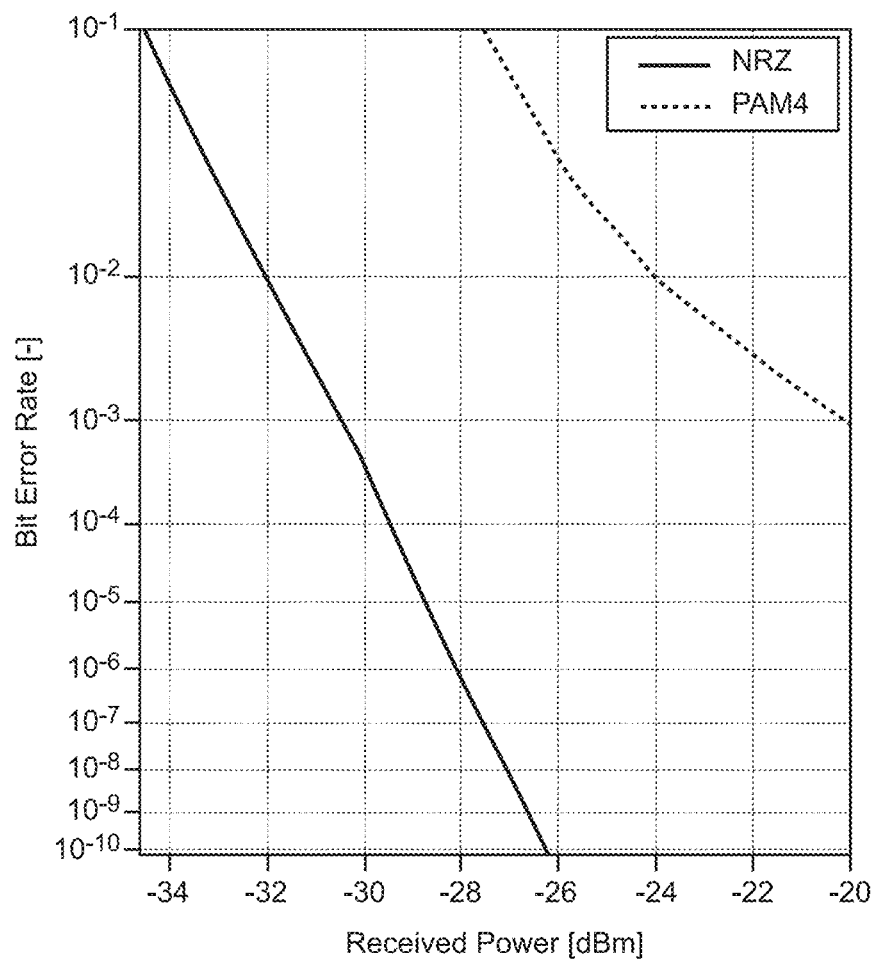
FIG. 6 is a chart illustrating example distributions of bit error rates (BER) according to at least one example embodiment.
Figure 7:
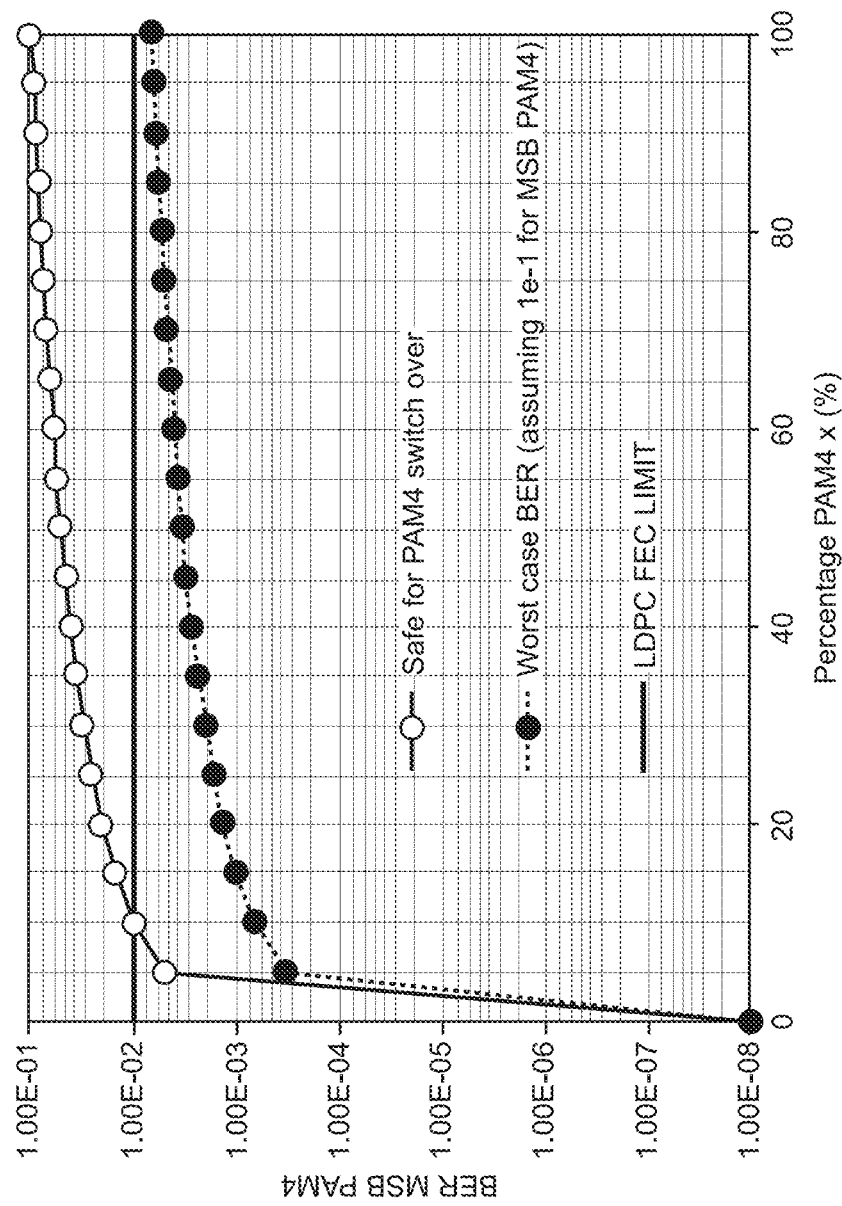
FIG. 7 is a chart illustrating example distributions of bit error rates (BER) according to at least one example embodiment.

FIG. 6 is a chart illustrating example distributions of bit error rates (BER) according to at least one example embodiment; and FIG. 7 is a chart illustrating example distributions of bit error rates (BER) according to at least one example embodiment.

Specifically, FIG. 6 shows and experimental BER curves of an NRZ and a PAM4. In the example it can be seen from the BER curves that when NRZ has $BER_{NRZ} < 1e\text{-}8$, PAM4 has $BER_{PAM4} < 1e\text{-}1$. Therefore, when a mixed FEC codeword with 5% PAM4 and 95% NRZ, a $BER_{5\%\ PAM4/95\%\ NRZ} < 5e\text{-}3$, which is correctable based on, e.g., the low-density parity-check code (LDPC code) of the G.09804 standard (which can correct up to $BER < 1e\text{-}2$).

Therefore, if the determined input BER when receiving just $NRZ < B_0$ ($1e\text{-}8$ in the example), an attempt to switch over to PAM4 can be made. In the example an MSB-PAM4 section of 5% is inserted into the FEC codeword, which results in an overall input BER (95% NRZ+5% MSB) below the correctable BER of $1e\text{-}2$. It can be seen in FIG. 7 that 10% MSB-PAM4 and 90% NRZ would also result in a correctable codeword.

Next the ONU determines the BER of the 5%/95% mixed codeword and reports if the determined input $BER < B1$ ($3.3e\text{-}3$ in the example, which ensures a safe switch-over).

The MSB-PAM4 section of the FEC codeword is increased in steps until 100% PAM4 is sent, in each step the input BER is determined and checked. With regards to FIG. 7, five steps are shown in table 1, but in principle two ("2") steps would be enough (5% and 100%) for a safe switch-over in this example. However, the extra steps may provide additional security. Further security can be built in by using the LSB for extra parity to protect the MSB.

TABLE 1

| x (%) | BER MSB PAM4/NRZ (Bn) |
|---|---|
| 0 | $<1e\text{-}8$ |
| 5 | $<3.3e\text{-}4$ (worst case $5e\text{-}3$) |
| 10 | $<6.7e\text{-}4$ (worst case $1e\text{-}2$) |
| 30 | $<2e\text{-}3$ |
| 60 | $<4e\text{-}3$ |
| 100 | $<6.7$ ($<1e\text{-}2$ PAM4) |

In the final check x=100% and the codeword comprises only of the PAM4 modulation, but the message data is still only encoded in the MSB of the PAM4. In the example, if $BER_{MSB} < 6.7e\text{-}3$ it can be assumed that $BER_{PAM4} < 1e\text{-}2$), but a final check can be made on the input BER of the LSB (for example when $BER_{LSB} < 1e\text{-}2$ also $BERPAM4 < 1e\text{-}2$) to determine if the signal quality is good enough to fully switch over to PAM4 thereby doubling the throughput to the particular ONU by sending data in the MSB as well as the LSB.

Figure 8:
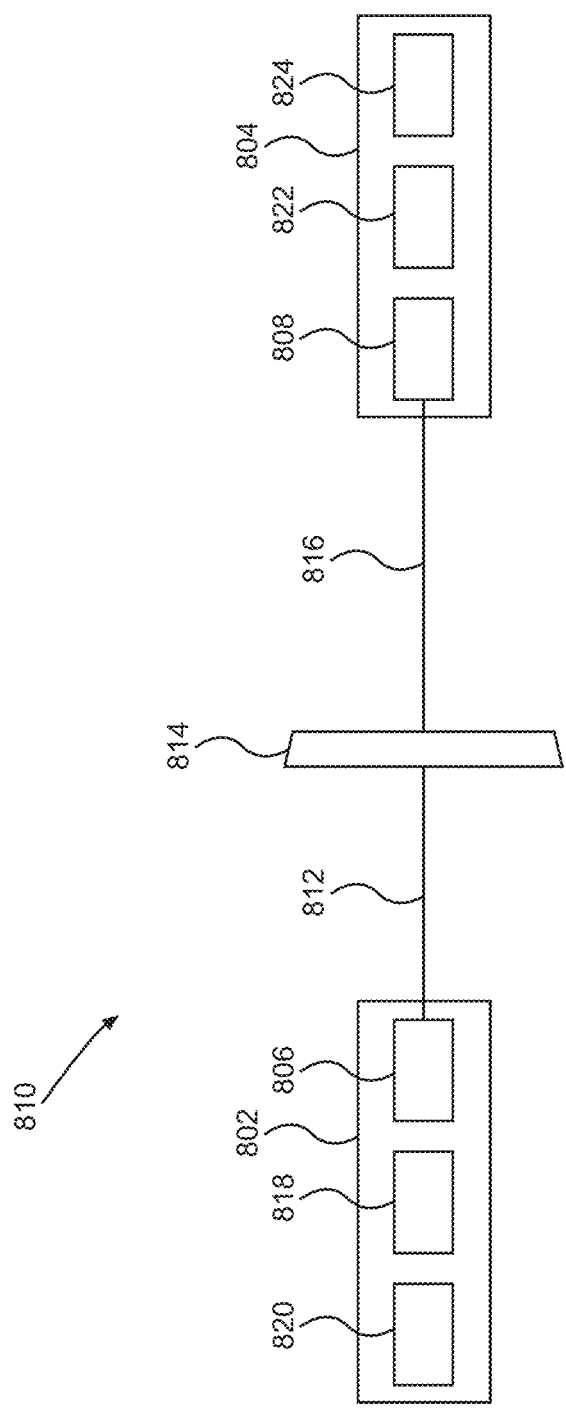
FIG. 8 schematically depicts a part of a passive optical network (PON).

FIG. 8 schematically depicts a part of a passive optical network (PON).

The passive optical network (PON) 810 may include a network side device 802, fiber optic cable 812 and 816, a splitter 814, and a user side device 804. The network side device 802, the splitter 814, and the user side device 804 may each be the same (and/or substantially similar to) the OLT 102, the PON splitter 104, and the ONUs described in reference to FIG. 1. For clarity of description, only a part of the PON 810 including a network side device 802 and a user side device 804 is described, but the example embodiments are not so limited, and the PON 810 can include more network side device 802 and/or a user side device 804 than illustrated.

The network side device 802 may comprise a receiver/transmitter 806, processing circuitry 818, and computer-readable medium 820 for storing instructions and/or data.

The user side device 804 may comprise a receiver/transmitter 808, processing circuitry 822, and computer-readable medium 824 for storing instructions and/or data.

The fiber optic cable 812 transmits communications between the transmitter 806 and the splitter 814. The fiber 816 transmits communications between the splitter 814 and the receiver 808.

The receiver/transmitters 806 and 808 may each include at least one of an optical transmitter and/or an optical receiver. For example, the optical transmitter may be (and/or include) an optical source such as a pulse modulated laser (and/or the like) and the optical receiver may be (and/or include) a photoelectric receiver such as a photodiode (and/or the like).

The processing circuitry 818 and 822 may each be (and/or include) hardware, software, or the combination of hardware and software. For example, the processing circuitry more specifically may include (and/or be included in), but is not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, application-specific integrated circuit (ASIC), semiconductor elements in an integrated circuit, circuits enrolled as an intellectual property (IP), etc.

The computer-readable medium 820 and 824 may each be (and/or include) a non-transitory memory system. For example, computer-readable medium may be a volatile memory device, which loses data stored therein when a power supply is interrupted (such as a dynamic random access memory (DRAM) device, a static RAM (SRAM) device, and/or the like), and/or a non-volatile memory device, which retains data stored therein even when a power supply is interrupted (such as a flash memory device, a phase-change RAM (PRAM), a magnetic RAM (MRAM), a resistive RAM (RRAM), and/or the like). The term "non-transitory," as used herein, is a limitation of the medium itself (e.g., as tangible, and not a signal) as opposed to a limitation on data storage persistency (e.g., RAM vs. ROM).

The computer-readable medium 820 and 824 may store instructions that, when executed by, e.g., the processing circuitry 818 and 822, may cause the network side device 802 and the user side device 804 to perform in accordance with the example embodiments described above (for example, as described in relation to FIGS. 4 and 5). In this way the PON 810 may confirm whether the BER of connection between the network side device 802 and the user side device 804 is low enough to facilitate a non-binary transmission, thereby allowing for a hybrid modulation multi-rate transmission PON without interruption of services to the user.

Benefits, other advantages, and solutions to problems have been described above with regard to specific embodiments of the invention. However, the benefits, advantages, solutions to problems, and any element(s) that may cause or result in such benefits, advantages, or solutions, or cause such benefits, advantages, or solutions to become more pronounced are not to be construed as a critical, required, or essential feature or element of any or all the claims.

Reference is made in detail to embodiments, examples of which are illustrated in the accompanying drawings, wherein like reference numerals refer to the like elements throughout. In this regard, the example embodiments may have different forms and should not be construed as being limited to the descriptions set forth herein. Accordingly, the example embodiments are merely described below, by referring to the figures, to explain example embodiments of the present description. Aspects of various embodiments are specified in the claims.

What is claimed is:

1. A method of operating an Optical Line Terminal (OLT) in a Passive Optical Network (PON), the method comprising:
determining whether a bit error rate (BER) of a forward error correction (FEC) codeword is at or below a correctable BER, wherein the FEC codeword is transmitted between the OLT and an optical network unit (ONU), a first percentage of the FEC codeword is at a lower order modulation, and a second percentage of the FEC codeword is at a higher order modulation; and
establishing, based on a determination that the BER is at or below the correctable BER, a connection between the OLT and the ONU at the higher order modulation.

2. The method of claim 1, wherein the first percentage of the lower order modulation is greater than the second percentage of the higher order modulation.

3. The method of claim 1, further comprising
initiating, based on a determination that the BER is at or below the correctable BER, a transmission of a second FEC codeword between the OLT and the ONU, a percentage of the higher order modulation for the second FEC codeword is greater than the second percentage; and
determining whether a second BER of the second FEC codeword is at or below the correctable BER,
wherein initiating the connection at the higher order modulation is further based on a determination that the second BER is at or below the correctable BER.

4. The method of claim 3, wherein the determining whether the second BER of the second FEC codeword is at or below the correctable BER includes
increasing the percentage of the higher order modulation,
determining whether a BER at the increased percentage is at or below the correctable BER,
initiating the connection at the higher order modulation when the BER at 100% the higher order modulation is at or below the correctable BER, and
maintaining a connection at the lower order modulation when at least one of the first BER, the second BER, or the BER at the increased percentage is greater than the correctable BER.

5. The method of claim 1, wherein message data of the FEC codeword is not encoded in a least significant bit (LSB) of the higher order modulation.

6. The method of claim 5, wherein the establishing of the connection between the OLT and the ONU at the higher order modulation includes transmitting data in a most significant bit (MSB) and the LSB of the higher order modulation connection.

7. The method of claim 1, further comprising:
transmitting the FEC codeword to the ONU.

8. The method of claim 7, further comprising:
receiving, from the ONU, a message including data about the BER of the transmitted FEC codeword,
wherein the determining whether the BER of the FEC codeword is at or below the correctable BER is based on the data about the BER of the transmitted FEC codeword received from the ONU.

9. The method of claim 1, further comprising:
receiving the FEC codeword from the ONU.

10. The method of claim 9, wherein the FEC codeword is received in a burst signal from the ONU, the burst signal including a plurality of the FEC codeword.

11. The method of claim 1, further comprising:
establishing a lower order modulation connection with the ONU; and entering a rate determining phase in response to the establishing of the lower order modulation connection, wherein the FEC codeword is transmitted in response to the entering the rate determining phase.

12. The method of claim 11, further comprising:
exiting the rate determining phase based on a determination that the BER is greater than the correctable BER; and
maintaining the established lower order connection.

13. The method of claim 1, further comprising:
determining whether a BER of a higher order FEC codeword is at or below the correctable BER, wherein the higher order FEC codeword includes the higher order modulation and a greater order modulation, wherein the greater order modulation is a higher order than the higher order modulation and the higher order FEC codeword includes a lower percentage of the greater order modulation compared to the higher order modulation; and
establishing, based on a determination that the BER is at or below the correctable BER, a connection between the OLT and the ONU at the greater order modulation.

14. The method of claim 13, wherein the higher order modulation and the greater order modulation are each a Quadrature Amplitude Modulation (QAM).

15. An apparatus comprising:

at least one processor; and at least one non-transitory memory including computer program code configured to, when executed by the at least one processor, cause the apparatus to determine whether a bit error rate (BER) of a forward error correction (FEC) codeword is at or below a correctable BER, wherein the FEC codeword is transmitted between an optical line terminal (OLT) and an optical network unit (ONU), a first percentage of the FEC codeword is at a lower order modulation, and a second percentage of the FEC codeword is at a higher order modulation, establish, based on a determination that the BER is at or below the correctable BER, a connection between the OLT and the ONU at the higher order modulation, and maintain, based on a determination that the BER is greater than the correctable BER, the connection between the OLT and the ONU at the lower order modulation.

* * * * *